United States Patent

[11] 3,628,035

| [72] | Inventors | Karl Erik Olsson;<br>Keijo Hellgren; George Lindblom, all of<br>Ludvika, Sweden |
|---|---|---|
| [21] | Appl. No. | 63,504 |
| [22] | Filed | Aug. 13, 1970 |
| [45] | Patented | Dec. 14, 1971 |
| [73] | Assignee | Allmanna Svenska Elektriska Aktiebolaget<br>Vasteras, Sweden |
| [32] | Priority | Sept. 1, 1969 |
| [33] | | Sweden |
| [31] | | 12046/69 |

[54] THYRISTOR-RECTIFIER CONTROLLED BY LIGHT PULSES OF EQUAL INTENSITY AT THE END OF LIGHT-CONDUCTING RODS
5 Claims, 2 Drawing Figs.

[52] U.S. Cl. ................................................ 250/227,
250/237, 307/252 Q, 307/311
[51] Int. Cl. .............................................. G02b 5/14

[50] Field of Search........................................... 307/252 Q,
311; 178/DIG. 2; 250/227; 200/61.02

[56] References Cited
UNITED STATES PATENTS
| 3,355,600 | 11/1967 | Mapham | 307/88.5 |
| 3,567,972 | 3/1971 | Faust | 307/311 |

*Primary Examiner*—Archie R. Borchelt
*Assistant Examiner*—D. C. Nelms
*Attorney*—Jennings Bailey, Jr.

ABSTRACT: A thyristor rectifier for high voltage is formed of a number of series connected thyristors each having its own control circuit to which control pulses are supplied by a common control device. Glass fiberlike conductors are used for transmitting the control pulses in the form of light pulses. The light intensity of the light pulses to some of the thyristors is adjusted in relation to others so as to adjust the firing times in relation to each other.

Patented Dec. 14, 1971

3,628,035

THYRISTOR-RECTIFIER CONTROLLED BY LIGHT PULSES OF EQUAL INTENSITY AT THE END OF LIGHT-CONDUCTING RODS

BACKGROUND OF THE INVENTION

1. Field of the Invention

The present invention relates to a thyristor-rectifier for high voltage, comprising a large number of series-connected thyristors controlled by a common control device, in which control pulses are transmitted from the control device to the individual control circuits of the thyristors in the form of light pulses by means of light conductors of glass fibers.

2. The Prior Art

When controlling a thyristor-rectifier with a plurality of series-connected thyristors it is of decisive importance for the correct functioning of the rectifier that the firing moments for the various thyristors are under control in relation to each other. Normally simultaneous firing is desired, that is, the spreading of the firing times and moments is kept within certain very narrow limits, but it is also possible to delay the firing moments in relation to each other deliberately. In either case there may be good voltage distribution between the thyristors during the ignition process so that none of these thyristors is subjected to dangerous overvoltages.

It has proved convenient for transferring control pulses from control device to thyristors to use light pulses which are transmitted by means of so-called light conductors, that is, bundles of glass fibers, and the insulating problem between the control device arranged at earth potential and the various thyristors arranged at high and varying potentials is thus eliminated.

Because of the positioning of the components in relation to each other, the light conductors for the various thyristors will be of different lengths, thus causing differing transmission times for the control pulses. Admittedly the speed of light is so great in relation to the length of the light conductors that the difference in transmission time in the conductors themselves is negligible. However, conductors of different lengths damp the light intensity to different degrees in the light pulses and, since the reaction time of the light-sensitive components in the control circuits of the thyristors is extremely dependent on the intensity of the light pulses, variations in this intensity also cause variations in firing times and thus displacement of the firing times of the thyristors.

One way of avoiding this displacement would be to use light conductors of the same length for all the thyristors. However, this increases the costs and it is inconvenient with extra length on the light conductors since it easily upsets the arrangement of the light conductors in the bundle for all the thyristors, which is already complicated enough.

SUMMARY OF THE INVENTION

Instead it is proposed according to the invention to deliberately reduce the light intensity in some of the control pulses so that the resultant light intensity of all parallel light pulses at the receiver point will be the same or will correspond to a certain desired ratio. Such a reduction or damping can be carried out by arranging the ends of the light conductors in question at a certain distance, possibly variable, from the light emitter or receiver of the light pulse. The amount of light received by the light conductors is then reduced because of the light diffusion in the space between. Another possibility is to insert a filter or diaphragm in the light paths, thus limiting the amount of light transmitted. A third possibility, which presupposes individual light-pulse emitters for the thyristors or groups of these, consists of varying the intensity of these light-pulse emitters.

BRIEF DESCRIPTION OF THE DRAWINGS

The invention will be further described with reference to the accompanying drawings in which FIG. 1 shows a thyristor-rectifier with light-pulse control, whereas

DESCRIPTION OF THE PREFERRED EMBODIMENTS

Figure 1:
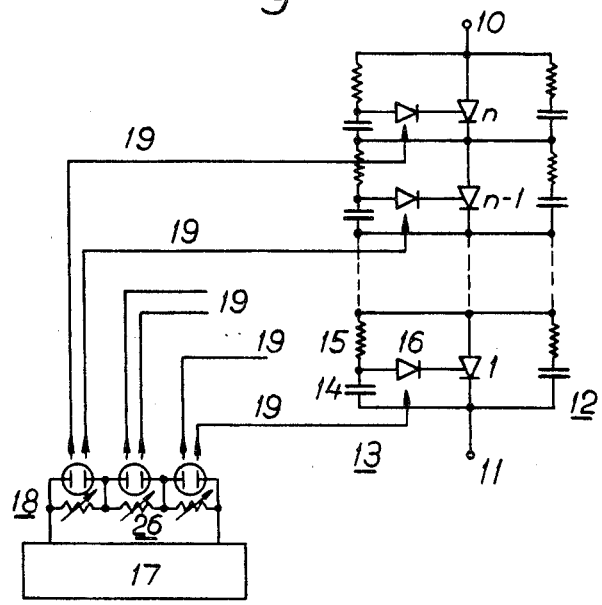

FIG. 1 shows a thyristor-rectifier having $n$ thyristors $1-n$ and anode and cathode connections 10, 11, respectively. The rectifier is connected in parallel with a voltage divider 12 which comprises for each thyristor resistive and capacitive elements. The rectifier is provided with an additional voltage divider 13 which, for each thyristor, comprises a capacitor 14 and a resistor 15. The capacitor 14 forms a control energy store for the thyristor concerned, whereby control energy can be supplied to the control electrode of the thyristor across a photodiode 16.

The thyristor-rectifier is controlled from a control pulse emitter 17 which may be provided on its output side with one or more light-pulse emitter 18, for example in the form of light diodes, from which light conductors 19 lead to the various photodiodes 16. In FIG. 1 the light conductors have been distributed in groups between the light diodes 18, but it is also possible for all the light conductors to be influenced by the same light diode.

For example, if an alternating voltage is imagined connected over anode-cathode, 10-11, in the thyristor-rectifier, the positive half-periods, that is when the anode 10 is positive in relation to the cathode 11, will charge the capacitors 14 with positive polarity on the upper half. If then the control pulse emitter 17 emits a light pulse from each of the light diodes 18, light pulses will be transmitted through the light conductors 19 to the photodiodes 16, whereupon the capacitors 14 will discharge over the control electrodes of the thyristors $1-n$ which will then become conducting so that the entire rectifier becomes conducting.

As mentioned previously, the different lengths of the light conductors 19 provide different degrees of damping of the light intensity of the light pulses and thus different firing times for the photodiodes 16. Even if these receive their firing pulses simultaneously, there will be differing delays before they become conducting and can transmit control energy to the thyristors.

Figure 2:
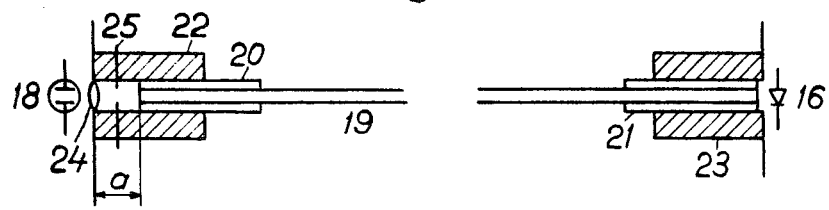
FIG. 2 shows a light-pulse transmission according to the invention for one of the thyristors in FIG. 1.

Said variation in the light intensity can, as mentioned, be compensated according to the invention as shown in FIG. 2. The Figure shows a photodiode 16 having light conductor 19 and light diode 18. The light conductor is provided with end sleeves 20 and 21 which are arranged in attachment casing 22 and 23 in the control pulse emitter 17 and the chassis of the thyristors, respectively. In order to adjust the damping in the light intensity of the light pulses received by the photodiode 16, the end sleeve 20 is displaceable in its attachment 22 so that the distance "a" from the light diode 18 or a lens 24 arranged in front of this to the end of the light conductor 19 can be varied. Instead of moving the end sleeve 20 in the attachment 22, the other end sleeve 21 can be moved in the attachment 23. However, this is often less convenient since it may be difficult to get at the chassis of the rectifier.

The adjustment may be done by permitting the light diodes 18 to emit constant light and compare the intensity of the light at the output in the end sleeve 21. A more exact result is achieved, however, if the control pulse emitter 17 is permitted to emit a short pulse and the control signals from the photodiodes 16 are registered, or even better, the firing moments for the thyristors $1-n$. In both cases, this is done by some type of electromagnetic recording, for example in the form of a high-speed tape recorder having a number of parallel tracks corresponding to the various thyristors.

FIG. 2 also shows how the light intensity of the light pulses can be altered by inserting a diaphragm 25 between the light diode 18 and the end of the light conductor 19 so that a part of the light from 18 is screened off. Instead of a diaphragm a filter or a darkened section could be used so that the light intensity can be varied continuously.

A third possibility of varying the light intensity is shown in FIG. 1 where each light diode 18 is parallel connected with a variable resistor 26 so that the current in the light diodes and thus the intensity of the light can be varied.

We claim:

1. A thyristor-rectifier for high voltage, comprising a plurality of series-connected thyristors; an individual control circuit for each of said thyristors; means to supply control pulses to said control circuits comprising a common control device for said thyristors for producing control pulses; and light conductors of glass fiber for transmitting said control pulses in the form of light pulses from said control device to said individual control circuits, said control pulse supply means including means to vary the light intensity of the light pulses to some of the thyristors in relation to other, whereby to adjust the firing times of the thyristors in relation to each other.

2. A thyristor-rectifier according to claim 1, in which said variation is carried out by arranging the end of the light conductor concerned at a certain distance from the emitter or the receiver of the light pulse.

3. A thyristor-rectifier according to claim 2, in which said distance is variable.

4. A thyristor-rectifier according to claim 1, in which said variation is carried out by insertion of a means in the light path for changing the transmission of light by said glass fibers.

5. A thyristor-rectifier according to claim 1, in which the control device comprises individual light pulse emitters for the thyristors or groups of these, said variation being carried out by reducing the light intensity of some of said light-pulse emitters.

* * * * *